(12) United States Patent
Daito

(10) Patent No.: US 7,390,967 B2
(45) Date of Patent: Jun. 24, 2008

(54) BINDING BAND-FIXING STRUCTURE

(75) Inventor: Koji Daito, Kosai (JP)

(73) Assignee: Yazaki Corporation, Tokyo (JP)

( * ) Notice: Subject to any disclaimer, the term of this patent is extended or adjusted under 35 U.S.C. 154(b) by 69 days.

(21) Appl. No.: 10/989,275

(22) Filed: Nov. 17, 2004

(65) Prior Publication Data
US 2005/0108858 A1    May 26, 2005

(30) Foreign Application Priority Data
Nov. 26, 2003   (JP)   ............................ P2003-395773

(51) Int. Cl.
*H02G 3/30* (2006.01)
(52) U.S. Cl. ..................... 174/72 A; 24/16 PB; 248/74.4
(58) Field of Classification Search ............... 174/72 A, 174/135; 24/16 PB, 30.5, 17 AP; 248/74.4, 248/74, 74.3, 74.5
See application file for complete search history.

(56) References Cited

U.S. PATENT DOCUMENTS 3,152,219 A * 10/1964 Murray et al. ............. 174/72 A
4,035,051 A    7/1977 Guy
5,401,905 A *  3/1995 Lesser et al. ............... 174/99 R
6,294,736 B1   9/2001 Takeda et al.

FOREIGN PATENT DOCUMENTS

JP    7-95714 A    4/1995

\* cited by examiner

*Primary Examiner*—Jinhee Lee
(74) *Attorney, Agent, or Firm*—Sughrue Mion, PLLC

(57) ABSTRACT

A structure of the invention for fixing an end portion of a binding band (10) includes a lock portion (11) having a band retaining portion provided within a band insertion hole (14), and a band portion (12) which extends from the lock portion (11), and has engagement portions (15) for retaining engagement with the band retaining portion. Wire harnesses are fixed in a bundled manner to a protector (40) by the band portion (12). A holder portion (16) in the form of a recess is formed in the protector (40), and has a shape similar to the outer shape of the lock portion (11), and this holder portion (16) includes a band passage hole for the passage of the band portion (12) therethrough, and an abutment surface provided at an end of the band passage hole. When the engagement portion (15) is retainingly engaged with the band retaining portion upon bundling of the wire harnesses, the lock portion (11) abuts against this abutment surface.

4 Claims, 5 Drawing Sheets

BINDING BAND-FIXING STRUCTURE

BACKGROUND OF THE INVENTION

1. Technical Field

This invention relates to a fixing structure for fixing an end portion of a binding band for fixing wire harnesses to a protector.

2. Related Art

As one example of conventional structures of fixing an end portion of a binding band, there is known the type of binding band end portion-fixing structure in which a lock portion 58 of a binding band 51 is fixed onto a frame-like wall 59 as shown in JP-A-07-095714.

In the binding band end portion-fixing structure disclosed in Unexamined Japanese Patent Publication H07-095714, when wire harnesses are to be fixed to a wire harness fixing portion 52 by the binding band 51 as shown in FIG. 5, a band portion 53 of the binding band 51 is passed through an insertion (passage) hole 54. When the band portion 53 is passed through the insertion hole 54, a retaining projection 57 of an engagement portion 56 is engaged with a retaining projection 55 on an inner surface of the insertion hole 54, thereby limiting the movement of the binding band 51. The binding band 51 can be moved in a direction of movement of the lock portion 58 toward the frame-like wall 59, but can not be moved in a direction of movement of the lock portion 58 away from the frame-like wall 59. When the band portion 53 of the binding band 51 is passed through the insertion hole 54 until the lock portion 58 is brought into abutting engagement with the frame-like wall 59, the binding band 51 can be fixed to the insertion hole 54.

After the binding band 51 is fixed to the insertion hole 54, the band portion 53 is wound around both of the wire harness fixing portion 52 and the wire harnesses, and a distal end portion of the binding band 51 is passed through the lock portion 58. Then, the band portion 53 is drawn out of the lock portion 58, and is tightened, and the distal end portion of the band portion 53, drawn out of the lock portion 58, is cut into a suitable length. In this condition, the retaining projection 57 is engaged with an engagement portion 61, thereby achieving a locked condition, and also the retaining projection 57 is engaged with the retaining projection 55 on the inner surface of the insertion hole 54, thereby limiting the upward movement of the band portion 53.

In Unexamined Japanese Patent Publication H07-095714, however, when the binding band 51 is kept fixed to the insertion hole 54, the lock portion 58 is prevented from movement only in an axial direction of the insertion hole 54, and when a connecting portion of the band portion 53, connected to the lock portion 58, is deflected, the band insertion hole in the lock portion 58 is not kept in a predetermined direction, and there has been a fear that the cut end of the band portion 53 is displaced to interfere with the wire harnesses to damage the wire harnesses.

And besides, the lock portion 58 is located on the frame-like wall 59, and therefore there has been a fear that the exposed lock portion 58 strikes against other member, so that the locking is loosened.

SUMMARY OF THE INVENTION

This invention has been made in view of the above circumstances, and an object of the invention is to provide a binding band-fixing structure in which damage of wire harnesses is prevented, and also a binding band is prevented from striking against other member, and therefore is prevented from being loosened, so that the quality and reliability can be enhanced.

According to the present invention, there is provided a binding band-fixing structure for fixing a binding band to a protector, the binding band including a lock portion having a band retaining portion provided within a band insertion hole; and a band portion which extends from the lock portion, and has a plurality of engagement portions formed thereon and arranged continuously in a longitudinal direction thereof, the engagement portions being engageable with the band retaining portion within the band insertion hole of the lock portion, wherein wire harnesses are fixed in a bundled manner to the protector by the band portion; provided in that a lock portion receiving portion for receiving the lock portion, as well as a band passage hole which communicates with the lock portion receiving portion so as to receive a connecting portion of the band portion connected to the lock portion, is provided within a side wall of the protector.

In the binding band-fixing structure described in the described above, the lock portion of the binding band is received in the lock portion receiving portion provided within the side wall of the protector, and therefore the lock portion will not project to the exterior in an exposed manner. And besides, the lock portion is fixed within the lock portion receiving portion, and therefore the band insertion hole is fixed in a predetermined direction. Therefore, the lock portion will not interfere with the wire harnesses, and therefore will not damage the wire harnesses, and also the lock portion will not strike against other member, so that the binding band is prevented from being loosened, and therefore the quality and reliability can be enhanced.

As the binding band, there can be used, for example, a so-called resin fastener which is formed into an integral construction, using a flexible resin, and has the strip-like band portion extending from the lock portion of a generally cubic shape. The band portion of the binding band is wound around the object(s) to be bound, and then is passed through the band insertion hole in the lock portion, and then the end portion of the band portion, drawn out of the lock portion, is pulled, so that a selected one of the engagement portions, formed and arranged on the band portion in the longitudinal direction, is retainingly engaged with the band retaining portion of the lock portion, thereby bundling the objects to be bound.

The binding band-fixing structure of the invention as defined in the described above is further provided in that the lock portion receiving portion includes an opening for inserting the lock portion thereinto, an abutment surface which communicates with the band passage hole so as to abut against the lock portion, a first wall, a second wall and a third wall which project into the opening so as to abut against the lock portion, and a fourth wall which is adapted to abut against that side surface of the lock portion, having the band insertion hole, in a manner to expose the band insertion hole in the lock portion.

In the binding band-fixing structure described in the described above, the band portion of the binding band is inserted into the band passage hole in the protector, and the distal end portion of the band portion is drawn out, and at the same time the lock portion is inserted into the lock portion receiving portion through the opening, and abuts against the abutment surface of the lock portion receiving portion, and is fixed. And besides, the lock portion is prevented by the first, second, third and fourth walls and the abutment surface for movement in all directions except one direction toward the opening, that is, in the five directions, and therefore the lock portion can be positively located in the proper position.

In the binding band end portion-fixing structure of the present invention, the binding band is prevented from striking against other member, and therefore is prevented from becoming loosened, so that the quality and reliability can be enhanced.

DETAILED DESCRIPTION OF THE PREFERRED EMBODIMENTS

A preferred embodiment of the present invention will now be described in detail with reference to the drawings.

Figure 1:
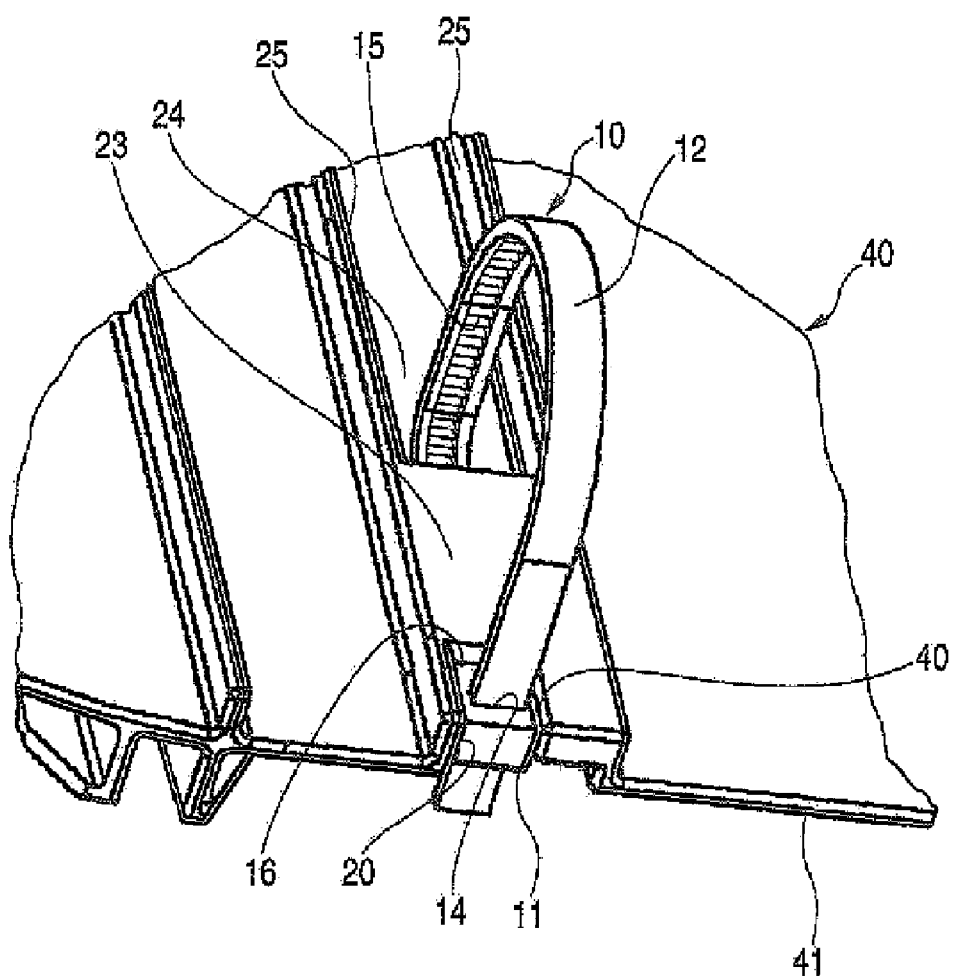
FIG. 1 is a perspective view of one preferred embodiment of a binding band end portion-fixing structure of the present invention, showing its appearance.

As shown in FIG. 1, the binding band-fixing structure of this embodiment is designed to fix a binding band 10 to the protector 40, and this binding band 10 includes a lock portion 11 having a band retaining portion 13 (shown in FIG. 2) provided within a band insertion (passage) hole 14, and the band portion 12 which extends from the lock portion 11, and has a plurality of engagement portions 15 formed thereon and arranged continuously in a longitudinal direction thereof, the engagement portions 15 being engageable with the band retaining portion 13 within the band insertion hole 14 of the lock portion 11. In this binding band-fixing structure, wire harnesses 30 (shown in FIG. 2) are fixed in a bundled manner to the protector 40 by the band portion 12. A lock portion receiving portion 16 for receiving and fixing the lock portion 11, as well as a band passage hole 17 which communicates with the lock portion receiving portion 16 so as to receive a connecting portion 12a of the band portion 12 connected to the lock portion 11, is provided within a side wall of the protector 40 having a top wall 23 and a bottom wall 24.

The holding portion 16 includes an opening 16a for inserting the lock portion 11 into the lock portion receiving portion 16, an abutment surface 18 which communicates with the band passage hole 17 so as to abut against the lock portion 11, a first wall 19, a second wall 20 and a third wall 21 which project into the opening so as to abut against the lock portion 11, and a fourth wall 22 which is adapted to abut against that side surface of the lock portion 11, having the band insertion hole 14, in a manner to expose the band insertion hole 14 in the lock portion 11.

The band passage hole 17 is provided between the top plate 23 and bottom plate 24 of the protector 40, and the abutment surface 18 is provided at an end of the bottom plate 24.

The binding band 10 includes the lock portion (also called "head portion") of a generally square tubular shape, and the sheet-like band portion 12 extending from the lock portion 11. The plurality of engagement portions 15, jointly assuming a corrugated shape, are formed on the band portion 12, and are arranged continuously in the longitudinal direction.

The holding portion 16 is formed in a portion of the protector 40, and the lock portion 11 of the binding band 10 is inserted into the holding portion 16 from the front side (in FIG. 1), with the band portion 12 passing therethrough rearwardly (in FIG. 1).

The holding portion 16 includes the abutment surface 18 disposed in an X axis-direction (in which the band portion 12 extends from the lock portion 11), the first wall 19 disposed in an anti-X axis direction opposite to the X axis-direction (in which the band portion 12 extends from the lock portion 11), the second wall 20 disposed at one side of the lock portion 11 in a Y-axis direction, the third wall 21 disposed at the other side of the lock portion 11 in an anti Y-axis direction and opposed to the second wall 20, and the fourth wall 22 disposed in a Z-axis direction in which the band portion 12 is inserted into the band insertion hole 14 in the lock portion 11.

The abutment surface 18 is recessed from an end surface 41 of the protector 40 by a distance slightly larger than a width of the lock portion 11 in the X-axis direction (in which the band portion 12 extends). When a band portion (12)-side end (one end) of the lock portion 11, received in the holding portion 16, abuts against the abutment surface 18, this abutment surface 18 prevents the movement of the lock portion 11 in the X-axis direction.

The first wall 19 is formed in continuous relation to the end surface 41 of the protector 40 opposed to the abutment surface 18, and is spaced from the abutment surface 18 by a distance slightly larger the width of the lock portion 11 in the X-axis direction (in which the band portion 12 extends). When the other end of the lock portion 11 (received in the holding portion 16), facing away from the band portion 12, abuts against the first wall 19, this first wall 19 prevents the movement of the lock portion 11 in the anti X-axis direction.

The second wall 20 is formed in continuous, perpendicular relation to the end surface 41 of the protector 40, and is disposed at the one side of the lock portion 11 in the Y-axis direction perpendicular to the X-axis direction (in which the band portion 12 extends). The second wall 20 prevents the movement of the lock portion 11, received in the holding portion 16, in the Y-axis direction.

The third wall 21 is formed in continuous, perpendicular relation to the end surface 41 of the protector 40, and is opposed to the second wall 20, and is disposed at the other side of the lock portion 11 in the anti Y-axis direction. The third wall 21 prevents the movement of the lock portion 1, received in the holding portion 16, in the anti Y-axis direction.

The fourth wall 22 is formed continuously with the third wall 21 in perpendicular relation to the first wall 19, and is disposed in the Z-axis direction in which the band portion 12 is inserted into the insertion hole 14 in the lock portion 11. The fourth wall 22 prevents the movement of the lock portion 11, received in the holding portion 16 in the Z-axis direction.

Figure 2:
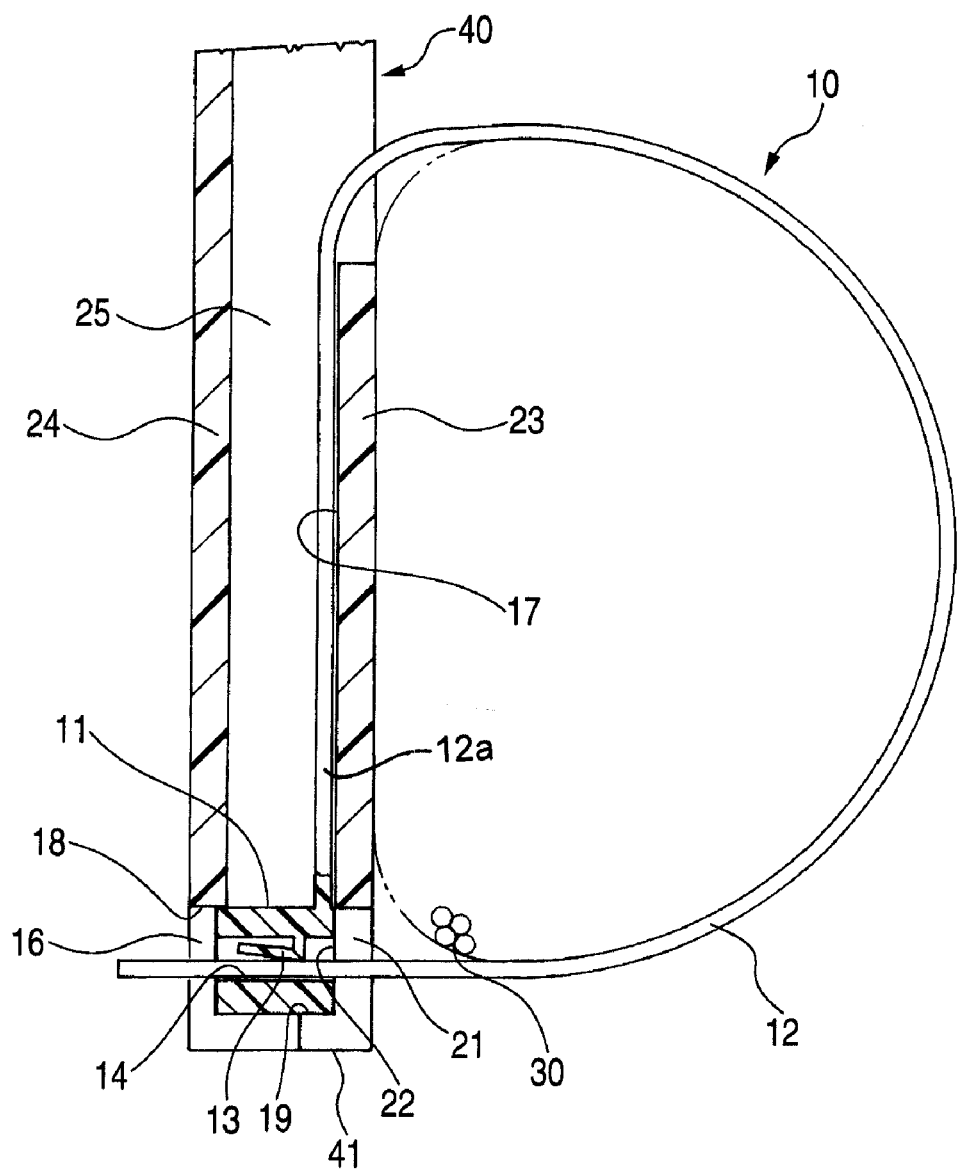
FIG. 2 is a vertical cross-sectional view of the binding band end portion-fixing structure of FIG. 1.

As shown in FIG. 2, the band insertion hole 14 for the passage of the band portion 12 therethrough is formed through the lock portion 11, and the band retaining portion 13 is formed on an inner surface of the band insertion hole 14. The band retaining portion 13 is engageable with the engagement portion 15 of the band portion 12 inserted in the band insertion hole 14, thereby fixing the band portion 12 to the lock portion 11.

The holding portion 16 has the band passage hole 17 formed between the top plate 23 and the bottom plate 24. The band portion 12 is inserted into the band passage hole 17, and then is drawn therefrom to the upper side of the top plate 23. The abutment surface 18 is formed at the end of the bottom plate 24.

The lock portion 11 is received in the holding portion 16 while the band portion 12 is passed through the band passage hole 17. As a result, the lock portion 11 is surrounded by the abutment surface 18, the first wall 19, the second wall 20, the third wall 21 and the fourth wall 22 which are disposed respectively in the X-axis direction, the anti X-axis direction, the Y-axis direction, the anti Y-axis direction and the Z-axis direction, so that the lock portion 11 is not exposed to the exterior. Therefore, the band insertion hole 14 in the lock portion 11 is kept in a predetermined direction. Then, the band portion 12 is drawn to the upper side of the top plate 23, and is wound around the wire harnesses 30, and is inserted into the band insertion hole 14 in the lock portion 11 received in the holding portion 16. Then, the band portion 12, drawn out of the lock portion 11, is pulled in the anti Z-direction, so that the engagement portion 15 is retainingly engaged with the band retaining portion 13 to thereby fix the band portion 12 to the lock portion 11, thus bundling the wire harnesses 30 together. Thereafter, the drawn-out end portion of the band portion 12 is cut into a predetermined length.

Figure 3:
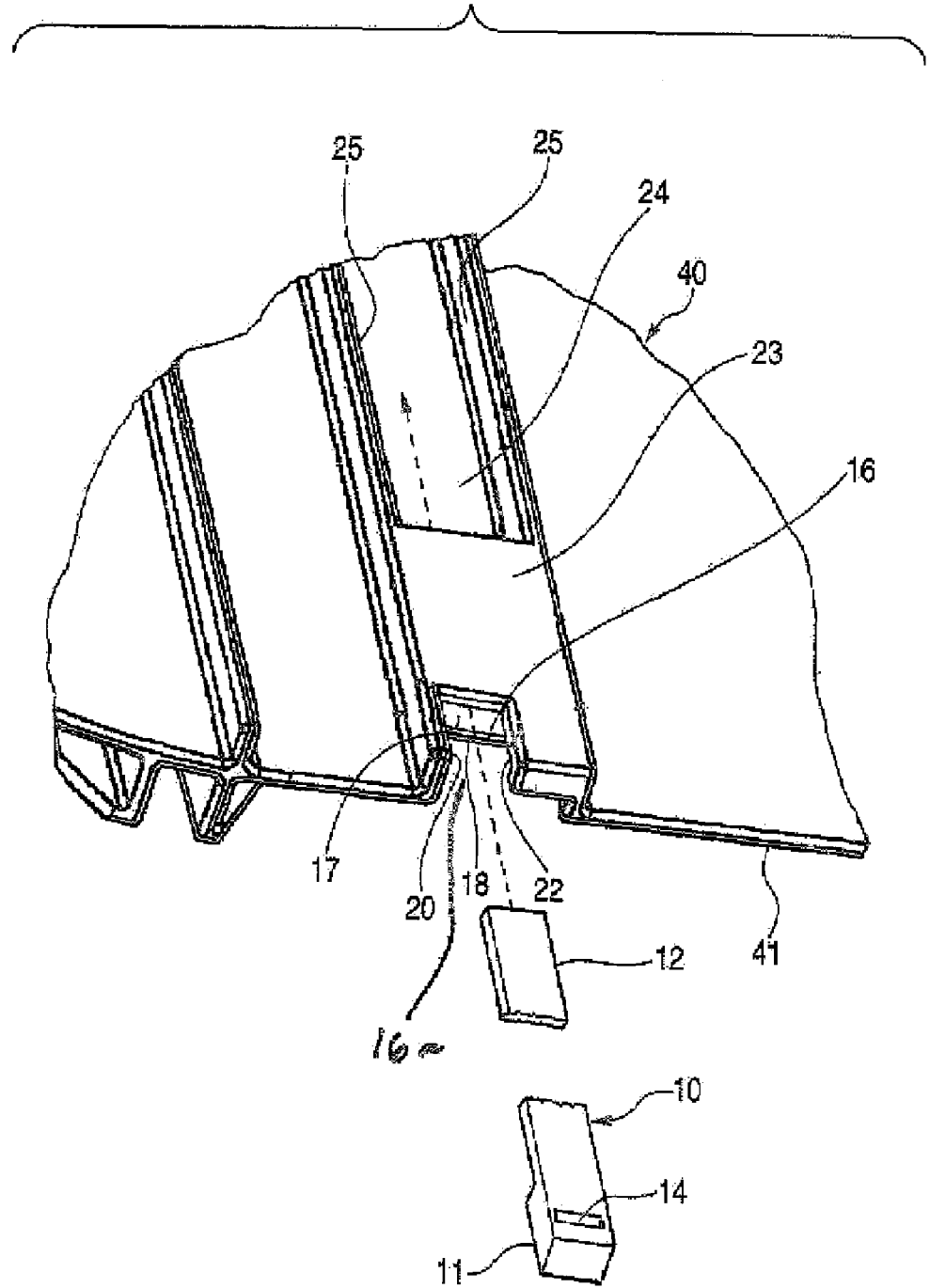
FIG. 3 is a perspective view of the binding band end portion-fixing structure of FIG. 1, showing a condition before the insertion of a band portion.

As shown in FIG. 3, a rear end portion of the top plate 23 is cut off or removed, and side walls 25 and 25 are provided at opposite sides of the band passage hole 17, respectively, and therefore the band portion 12 can be easily drawn out to the upper side of the top plate 23.

Figure 4:
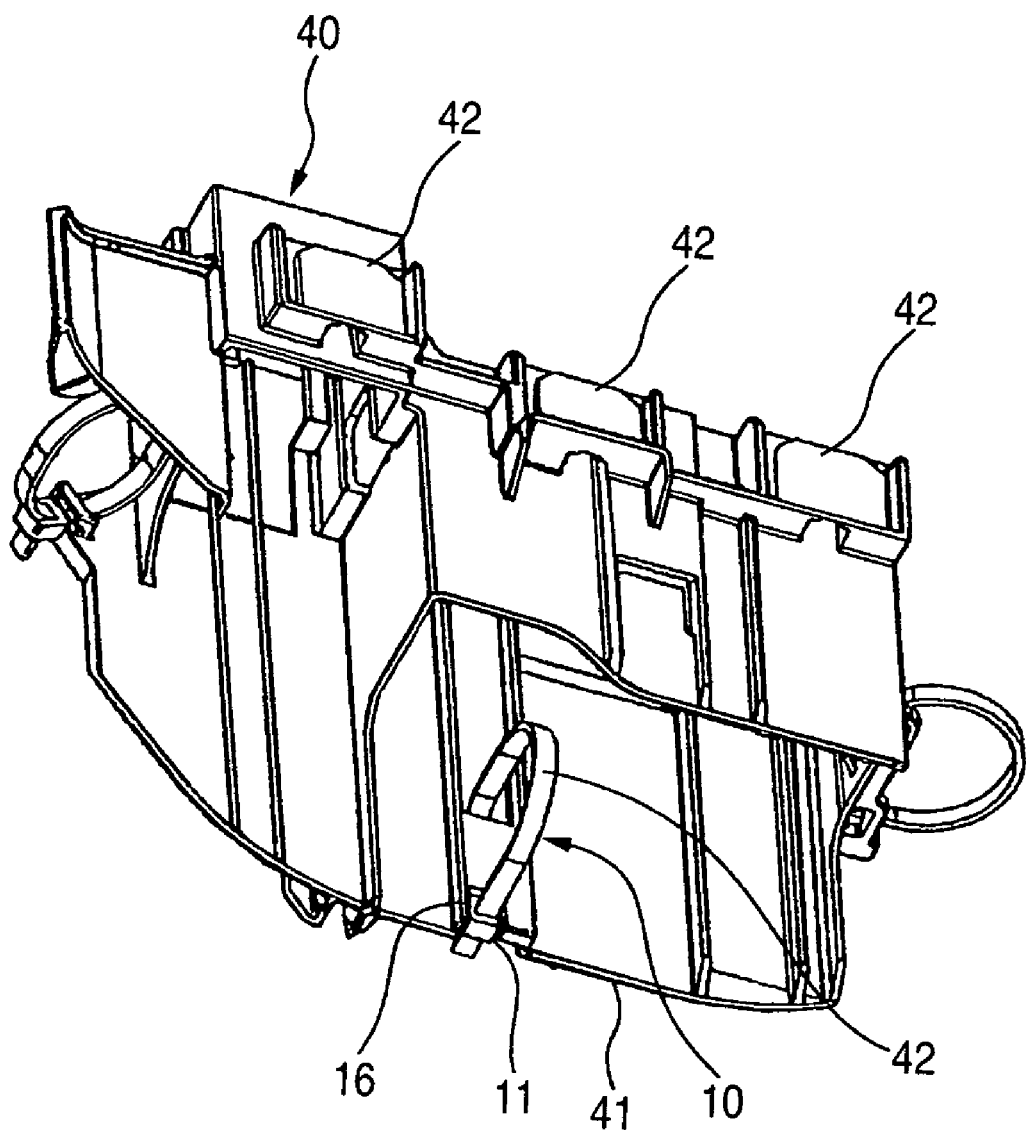
FIG. 4 is a view showing the whole of a protector employing the binding band end portion-fixing structure of FIG. 1, showing its appearance.
Figure 5:
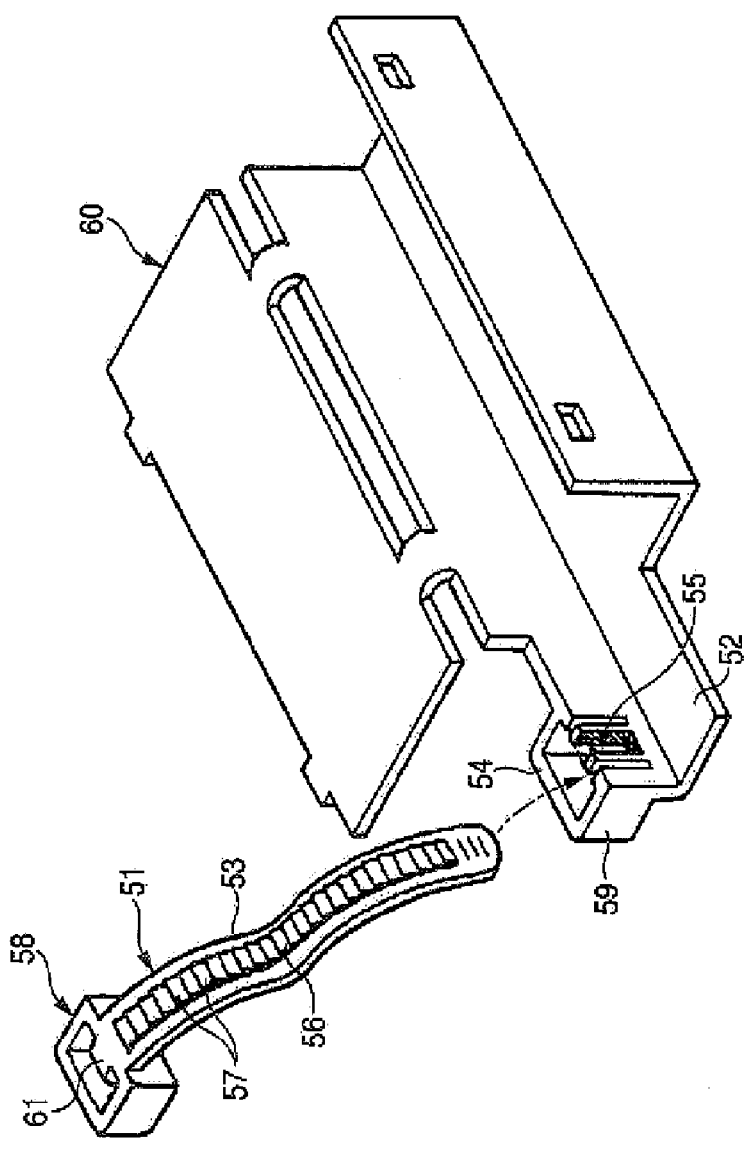
FIG. 5 is a view of a conventional binding band end portion-fixing structure, showing its appearance.

As shown in FIG. 4, a plurality of connector fixing portions 42, 42 and 42 are provided at an end portion of the protector 40, and a plurality of connectors (not shown) are mounted in these connector fixing portions 42, 42 and 42, respectively. Also, a plurality of connector fixing portions (not shown) are provided in the interior of the protector having a generally square tubular shape, and a plurality of connectors (not shown) are mounted in these connector fixing portions, respectively. Part of the wire harnesses 30, extending from the plurality of connectors, are bound together by the corresponding binding band 10 held in the holding portion 16, and are fixed to the protector 40.

As described above, in the structure of this embodiment for fixing the end portion of the binding band 10, the band portion 12 is passed through the band passage hole 17, and the lock portion 11 is located in the holding portion 16 defined by the recess portion which is formed in the protector 40, and has the shape similar to the outer shape of the lock portion 11. Then, when the wire harnesses 30 are bound together by the band portion 12, the engagement portion 15 of the band portion 12 is retainingly engaged with the band retaining portion 13 of the lock portion 11, and as a result the lock portion 11 abuts against the abutment surface 18, and is held in the holding portion 16. In this condition, the band insertion hole 14 in the lock portion 11 is kept in the predetermined direction. Therefore, the lock portion will not interfere with the wire harnesses 30 and also with other nearby wire harnesses (not shown), and besides the lock portion is not projected from the holding portion, and therefore will not strike against other members. Thus, the lock portion will not damage the wire harnesses, and also will not strike against other members, so that the quality is enhanced.

And besides, in the structure of this embodiment for fixing the end portion of the binding band 10, the lock portion 11 is prevented by the abutment surface 18 from movement in the X-axis direction, and is prevented by the first wall 19 from movement in the anti X-axis direction, and is prevented by the second wall 20 from movement in the Y-axis direction, and is prevented by the third wall 21 from movement in the anti Y-axis direction, and is prevented by the fourth wall 22 from movement in the Z-axis direction. Thus, the lock portion 11 is prevented form movement in all of the five directions, and therefore the lock portion 11 will not be displaced out of position, and can be positively located in the proper position.

Furthermore, in the structure of this embodiment for fixing the end portion of the binding band 10, when the band portion 12 is passed through the band passage hole 17, the lock portion 11 abuts against the abutment surface 18 formed at the end of the bottom plate 24 forming the band passage hole 17. Therefore, the abutment surface 18 does not need to be formed by a separate construction, so that the productivity can be enhanced.

The present invention is not limited to the above embodiment, and suitable modifications, improvements and so on can be made. For example, the protector is not limited to any specified shape, and a suitable shape can be selected depending on conditions such as a space available in a vehicle. In this case, also, the holding portion of a recessed shape is formed in the protector.

What is claimed is:

1. A binding band-fixing structure comprising:
   a binding band including:
   a lock portion having a band retaining portion provided within a band insertion hole;
   a band portion extending from said lock portion, and having a plurality of engagement portions formed thereon and arranged continuously in a longitudinal direction thereof, said engagement portions being engageable with said band retaining portion within said band insertion hole of said lock portion;
   a protector to which the binding band is fixed, a side wall of the protector including:
   a lock portion receiving portion for receiving and securing said lock portion;
   a band passage hole which receives a connecting portion of said band portion connected to said lock portion; said band passage hole communicates with said lock portion receiving portion.

2. A binding band-fixing structure according to claim 1, wherein said lock portion receiving portion includes;
   an opening for inserting said lock portion thereinto,
   an abutment surface which communicates with said band passage hole so as to abut against a first surface of said lock portion, and
   a first wall configured to abut a second surface of said lock portion, said second surface of said lock portion opposing said first surface.

3. A binding band-fixing structure according to claim 1, wherein said band passage hole is disposed between top and bottom plates associated with the protector.

4. The binding band-fixing structure according to claim 2, further comprising:
   a second wall which abuts said lock portion,
   a third wall which project into said opening and opposes said second wall, and
   a fourth wall which abuts against that side surface of said lock portion having said band insertion hole, in a manner to expose said band insertion hole in said lock portion.

* * * * *